United States Patent
Jeyaseelan et al.

(10) Patent No.: US 9,158,357 B2
(45) Date of Patent: Oct. 13, 2015

(54) SYSTEM AND METHOD FOR CONVEYING SERVICE LATENCY REQUIREMENTS FOR DEVICES CONNECTED TO LOW POWER INPUT/OUTPUT SUB-SYSTEMS

(71) Applicant: Intel Corporation, Santa Clara, CA (US)

(72) Inventors: Jaya L. Jeyaseelan, Cupertino, CA (US); Linda Weyhing, Ann Arbor, MI (US); Rajeev Nalawadi, El Dorado Hills, CA (US); Barnes Cooper, Tigard, OR (US); Suraj Varma, Portland, OR (US); Nevo Idan, Zichron Ya'akov (IL); David Poisner, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 13/730,625

(22) Filed: Dec. 28, 2012

(65) Prior Publication Data
US 2014/0189391 A1 Jul. 3, 2014

(51) Int. Cl.
*G06F 1/26* (2006.01)
*G06F 1/32* (2006.01)

(52) U.S. Cl.
CPC ............ *G06F 1/3206* (2013.01); *G06F 1/3234* (2013.01); *G06F 1/3287* (2013.01)

(58) Field of Classification Search
CPC ..... G06F 1/325; G06F 1/3206; G06F 1/3234; G06F 1/3287
USPC .................................................. 713/300, 320
See application file for complete search history.

(56) References Cited

U.S. PATENT DOCUMENTS

| | | | |
|---|---|---|---|
| 7,137,018 B2 * | 11/2006 | Gutman et al. ............... | 713/323 |
| 7,716,506 B1 * | 5/2010 | Surgutchik et al. ........... | 713/321 |
| 8,595,522 B2 * | 11/2013 | Cooper et al. ................ | 713/320 |
| 8,799,687 B2 * | 8/2014 | Naveh et al. .................. | 713/300 |
| 2008/0307240 A1 * | 12/2008 | Dahan et al. .................. | 713/320 |
| 2009/0109797 A1 * | 4/2009 | Eidson ............................ | 368/10 |
| 2009/0249103 A1 | 10/2009 | Jeyaseelan et al. | |
| 2010/0169684 A1 | 7/2010 | Jeyaseelan et al. | |
| 2010/0211702 A1 * | 8/2010 | Klapproth et al. .............. | 710/18 |
| 2010/0241880 A1 * | 9/2010 | Wertheimer et al. .......... | 713/310 |
| 2012/0131370 A1 * | 5/2012 | Wang et al. .................... | 713/323 |
| 2013/0275791 A1 * | 10/2013 | Ulmer et al. .................. | 713/323 |
| 2013/0290758 A1 * | 10/2013 | Quick et al. .................. | 713/323 |

\* cited by examiner

*Primary Examiner* — Mark Connolly
(74) *Attorney, Agent, or Firm* — Patent Capital Group

(57) ABSTRACT

In at least one embodiment described herein, an apparatus is provided that can include means for communicating a latency tolerance value for a device connected to a platform from a software latency register if a software latency tolerance register mode is active. The apparatus may also include means for communicating the latency tolerance value from a hardware latency register if a host controller is active. The latency tolerance value can be sent to a power management controller. More specific examples can include means for communicating a latency tolerance value from the software latency register if the software latency tolerance register mode is not active and the host controller is not active. The apparatus can also include means for mapping a resource space in the software latency register for the device using a BIOS/platform driver. The mapping can be achieved using an advanced configuration and power interface device description.

27 Claims, 8 Drawing Sheets

SYSTEM AND METHOD FOR CONVEYING SERVICE LATENCY REQUIREMENTS FOR DEVICES CONNECTED TO LOW POWER INPUT/OUTPUT SUB-SYSTEMS

TECHNICAL FIELD

Embodiments described herein generally relate to providing for power savings in a processor environment.

BACKGROUND

As electronic devices become more complex and more ubiquitous in the everyday lives of users, more and more diverse requirements are placed upon them. For example, many electronic devices can operate on battery power, thus allowing users to operate these devices in many different circumstances. In addition, as capabilities of electronic devices become more extensive, many users may become reliant on the enhanced performance such capabilities provide. As these aspects of electronic devices have evolved, there has become an increasing need for power optimization so that users may enjoy longer battery life. However, under many circumstances, power optimization may sacrifice performance. Therefore, it will be highly beneficial for a user to be able to have the desired performance when it matters the most to them, and to have power optimization during circumstances where performance may be less important to them.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to providing a power savings in a processor environment. Features such as structure(s), function(s), and/or characteristic(s), for example, are described with reference to one embodiment as a matter of convenience; various embodiments may be implemented with any suitable one or more of the described features.

Figure 1:
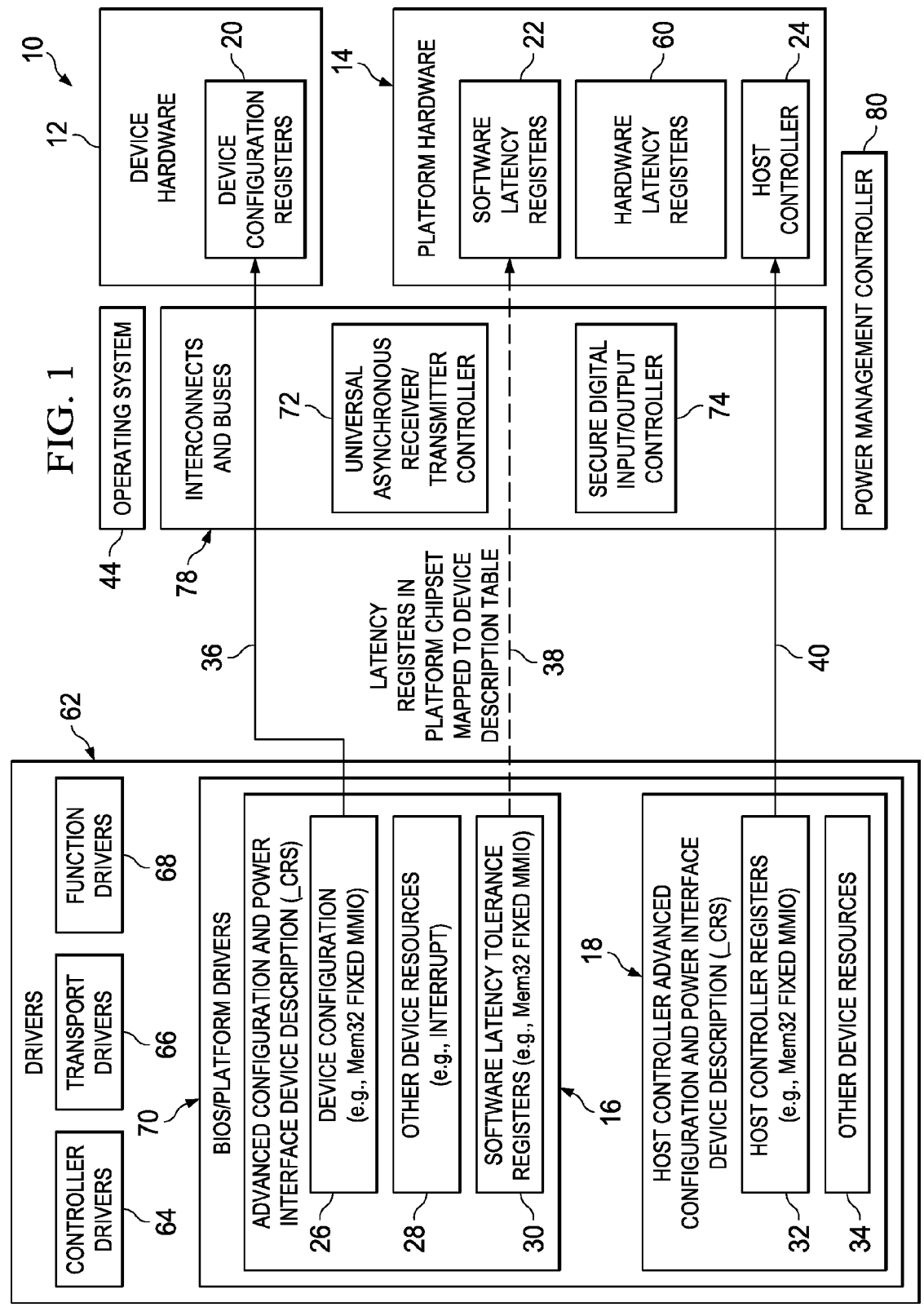
FIG. 1 is a simplified schematic diagram illustrating an embodiment of an electronic device, in accordance with one embodiment of the present disclosure.

FIG. 1 is a block diagram illustrating software component interaction of an electronic device 10 according to at least one example embodiment. The examples of FIG. 1 are merely examples of software component interaction, and do not limit the scope of the claims. For example, operations attributed to a software component may vary, number of software components may vary, composition of a software component may vary, and/or the like. For example, in some example embodiments, operations attributable to one software component of the example of FIG. 1 may be allocated to one or more other software components. In addition, the examples of FIG. 1 are merely examples of an electronic configuration, and do not limit the scope of the claims. For example, the number of electrical components may vary, the placement of the electrical components may vary, and/or the like.

In at least one example embodiment, electronic device 10 comprises device hardware 12, platform hardware 14, an operating system 44, drivers 62, interconnects and buses 78, and power management controller 80. Device hardware 12 includes device configuration registers 20. Platform hardware 14 includes software latency registers 22, hardware latency registers 60, and a host controller 24. Drivers 62 include controller drivers 64, transport drivers 66, function drivers 68, and Basic Input and Output System (BIOS)/Platform drivers 70. BIOS/Platform drivers 70 include advanced configuration and power interface (ACPI) device description 16 and a host controller ACPI device description 18. Note that the present disclosure can be applicable to ACPI™ Revision 5.0, released in November 2011. Additionally, the present disclosure is applicable to any other version of the ACPI™ Specification. ACPI 16 includes device configuration 26, device resources 28, and software latency tolerance registers 30. Host controller ACPI 18 includes host controller registers 32 and device resources 34. Interconnects and buses 78 include a universal asynchronous receiver/transmitter (UART) controller 72 and a secure digital input/output (SD I/O) controller 74.

System power may be managed by placing the system, and/or one or more parts of the system, into power states that influence the operation of the system such that the power consumption of the system differs across different power states. There may be a tradeoff associated with each power state between performance and power savings. For example, higher power saving power states may be associated with a longer delay in placing the system, and/or one or more parts of the system into a state that allows for execution of instructions.

For purposes of illustrating certain example techniques of electronic device 10, it is important to understand that current platform-level power management is based on some heuristics collected on the platform and some guidance given by an operating system. As such, processor utilization is often used as a rough estimate of platform activity. When there is heavy input/output (I/O) activity and light processor utilization, however, the platform can be put into lower power states, impacting I/O performance. Indeed, as a platform goes into deeper power states, its response latency to break events like direct memory access (DMA) accesses and interrupts increases. Although many I/O devices are designed to tolerate some fixed minimum response latency from the platform, this can effectively limit the depth of power states which the platform may enter. The platform could compromise functionality and/or performance if the platform entered a deeper power state that increased its response latency beyond the fixed minimum an I/O device could tolerate.

Platform manufacturers have to work closely to qualify devices and, further, have a prior knowledge on whether a device is able to be consistent with the latency requirements for the platform. For devices that are connected to buses that support latency tolerance messaging, the devices can use the mechanisms defined in the Specification to indicate their latency requirements. For devices that are connected to buses that do not support latency tolerance messaging (SDIO, UART, Inter-Integrated Circuit (I2C), etc.), since there is no dynamic mechanism for latency indication, often platform components are kept in a high power state to provide the required performance. As a result, these platforms are unable to enter deeper low power states.

Particular embodiments described herein allow for device driver software (e.g., BIOS/Platform drivers 70) of connected peripherals to dynamically update hardware registers (e.g., hardware latency registers 60) in a platform address space assigned to the connected peripherals on activity levels. Updates to the hardware register can trigger a latency tolerance message to be sent to a platform power management controller (e.g., power management controller 80 which may forward the message to ACPI device description 16). Device driver software (e.g., device configuration 26) is able to convey the requirements of a specific device's latency based on activity levels. The device driver software can indicate larger latency tolerance when idle, thereby allowing the platform (e.g., electronic device 10) to go into deeper high latency low power states. When the latency is lower, based on device buffering and other performance requirements, the platform may go into a low latency high power state.

Hardware latency registers 60 in the platform (e.g., platform hardware 14) are accessible within the platform address space by host controller registers 32. Devices can write to the hardware registers and trigger latency tolerance messages to be sent to a platform power management controller (e.g., power management controller 80). BIOS or a platform driver (e.g., BIOS/Platform drivers 70) can configure latency registers (e.g., software latency registers 22) in platform (e.g., platform hardware 14) accessible to the device driver. The mechanism used to make the hardware registers accessible can vary and may depend on the platform implementation.

In an embodiment, the mechanism may include a BIOS change to map latency registers in the platform (e.g., platform hardware 14) to allocate resource space (e.g., in software latency registers 22) and allow the device driver to access the latency registers via memory mapped I/O registers (e.g., software latency tolerance registers 30). In another embodiment, the mechanism may include a platform driver (from BIOS/platform drivers 70) which can directly read or write to a device configuration register (e.g., device configuration registers 20) and expose an application programming interface (API) (e.g. function driver 68 or transport driver 66) to device driver (e.g., software latency tolerance registers 30) for accessing software latency registers 22. In another embodiment, a host controller driver 64 can directly read or write to software latency registers 22 and expose API interface to device driver (e.g. function driver 68 or transport driver 66) for accessing the software latency tolerance register 22.

Figure 2:
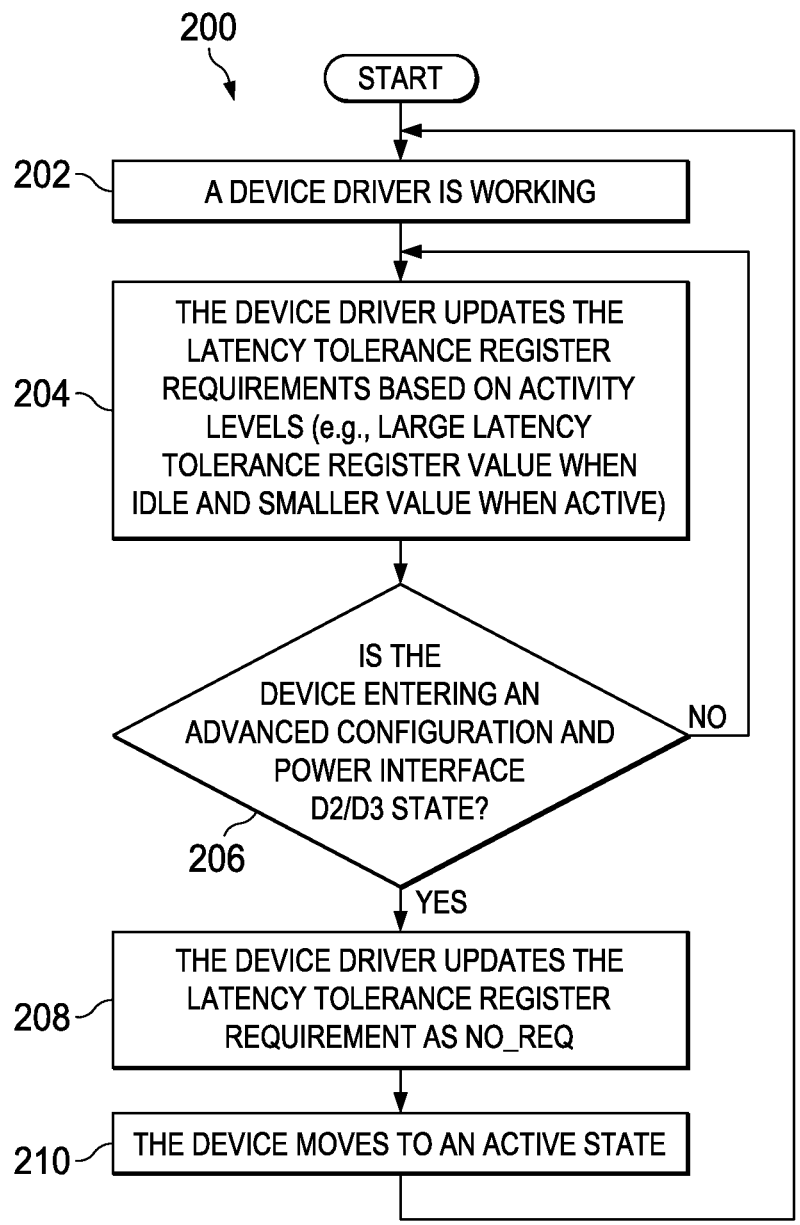
FIG. 2 illustrates, for one embodiment, an example flow diagram in accordance with one embodiment of the present disclosure.

Turning to FIG. 2, FIG. 2 is a simplified flowchart 200 illustrating one potential operation associated with the present disclosure. At 202, a device is working (and connected to a platform). The device may be any device that has latency requirements. At 204, the device driver updates latency tolerance register requirements based on activity levels (e.g., the device can have a large latency tolerance value when idle and a smaller latency tolerance value when active). At 206, the system determines if the device is entering an ACPI D2 or D3 state. If the device is not entering an ACPI D2 or D3 state, then the device driver updates latency tolerance register requirements based on activity levels, as in 204. If the device is entering an ACPI D2 or D3 state, then the device driver updates the latency tolerance register requirement (e.g., as a no tolerance requirement or NO_REQ), as in 208. At 210, the device moves to an active state and returns to 202 where the device driver is working and the device driver updates latency tolerance register requirements based on activity levels, as in 204.

Even though sleep power states described herein relate to ACPI, it should be understood that ACPI is merely an example of a power management scheme that may be utilized to manage power in a processor or a system. Therefore, direct references to specific elements of the ACPI do not limit the claims, unless such specific elements are expressly incorporated into the claims. Device power states under the example ACPI standard used herein, may be referred to as D-level states. Power state D0 is associated with the device being fully on and in an operating state. Power state D0 may be associated with absence of power or thermal savings, and may be referred to as an operation mode.

Power states D1 and D2 may be associated with intermediate power-states whose definition varies by device. Device power state D1 is the highest-powered device low-power state. The power consumption in a D1 state is less than in the D0 state but greater than or equal to that in the D2 state. Frequently, D1 is a clock-gated state in which the device receives just enough power to preserve the device's hardware context. Typically, the Specification for a bus or device class that supports D1 describes this state in more detail. Generally the device context is preserved by the hardware and need not be restored by the driver. The Specification for a bus or device class that supports D1 typically provides detailed requirements for preserving this context. The device driver behavior should save and restore or reinitialize any context lost by the hardware. Typically, however, devices lose little context upon entering this state. The restore time (the time required to restore the device to D0 from D1) should be less than restoration from D2 to D0. Typically, devices that use D1 do so because resuming from this state does not require the driver to restore the device's full hardware context.

Power state D2 is an intermediate device low-power state where power consumption is less than or equal to that in the D1 state. In general, most device context is lost by the hardware when in a D2 state. Frequently, the state preserves the part of the context that is used to signal wake events. The Specification for a bus or device class that supports D2 typically provides detailed requirements for preserving this context. A typical device generally loses the most context when it enters D2 and therefore, device drivers should save and restore or reinitialize any context lost by the hardware. The restore time from D2 to D0 takes at least as long as restoring the device from D1 to D0. Typically, drivers that support D2 do so because their devices cannot support a wake from D3. For these devices, power consumption in the D2 state drops to the lowest level from which the device can recover in response to a wake signal. In contrast to the D1 state, which is implemented to reduce the delay perceived by the user, the goal in implementing the D2 state is to conserve power. As a result, the restore time from D2 to D0 typically exceeds that from D1 to D0. In the D2 state, for example, reduced power on the bus might cause a device to turn off some of its functionality, thus requiring additional time to restart and restore the device. Many classes of device do not define a D2 state.

Power State D3 has the device powered off and unresponsive to its bus. The D3 state may be referred to as a sleep state. The D3 state can be further divided into two sub-states, D3-hot and D3-cold. When a device is in a D3-hot state, the device has auxiliary power. When the device is in a D3-cold state, the device does not have any (or little) power provided. A device in D3-hot can assert power management requests to transition to higher power states.

Figure 3:
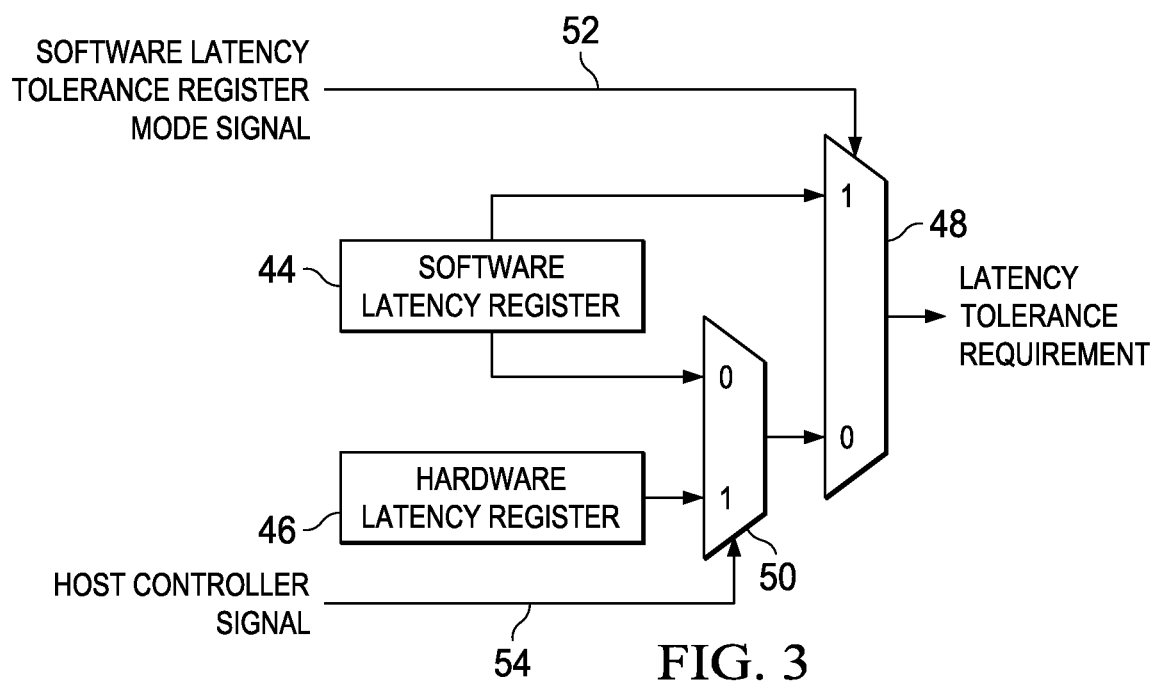
FIG. 3 is a simplified schematic diagram illustrating an embodiment of an electronic device, in accordance with one embodiment of the present disclosure.

FIG. 3 is a block diagram illustrating component interaction between software latency register 44 and hardware latency register 46 in according to at least one example embodiment. The examples of FIG. 3 are merely examples of component interaction, and do not limit the scope of the claims. For example, the number of electrical components may vary, the placement of the electrical components may vary, operations attributed to a software component may vary, number of software components may vary, composition of a software component may vary, and/or the like. In some example embodiments, operations attributable to one software component may be allocated to one or more other software components.

In at least one example embodiment, electronic device 10 includes software latency register 44, hardware latency register 46, first logic gate 48, and second logic gate 50. The hardware latency register 46 is applicable only if the software latency tolerance register mode is not enabled. In this case, if the host controller active signal 54 is active (i.e., the host controller is active), then the value in the hardware latency register 46 is used. If the host controller is in a D3 state or is otherwise not moving data, then host controller active signal 54 is not active. When a software latency tolerance (LTR) mode signal 52 is active, then the value in the software latency register 44 is used. Software LTR mode signal 52 is a static bit that can be enabled by BIOS/platform drivers 70.

Figure 4:
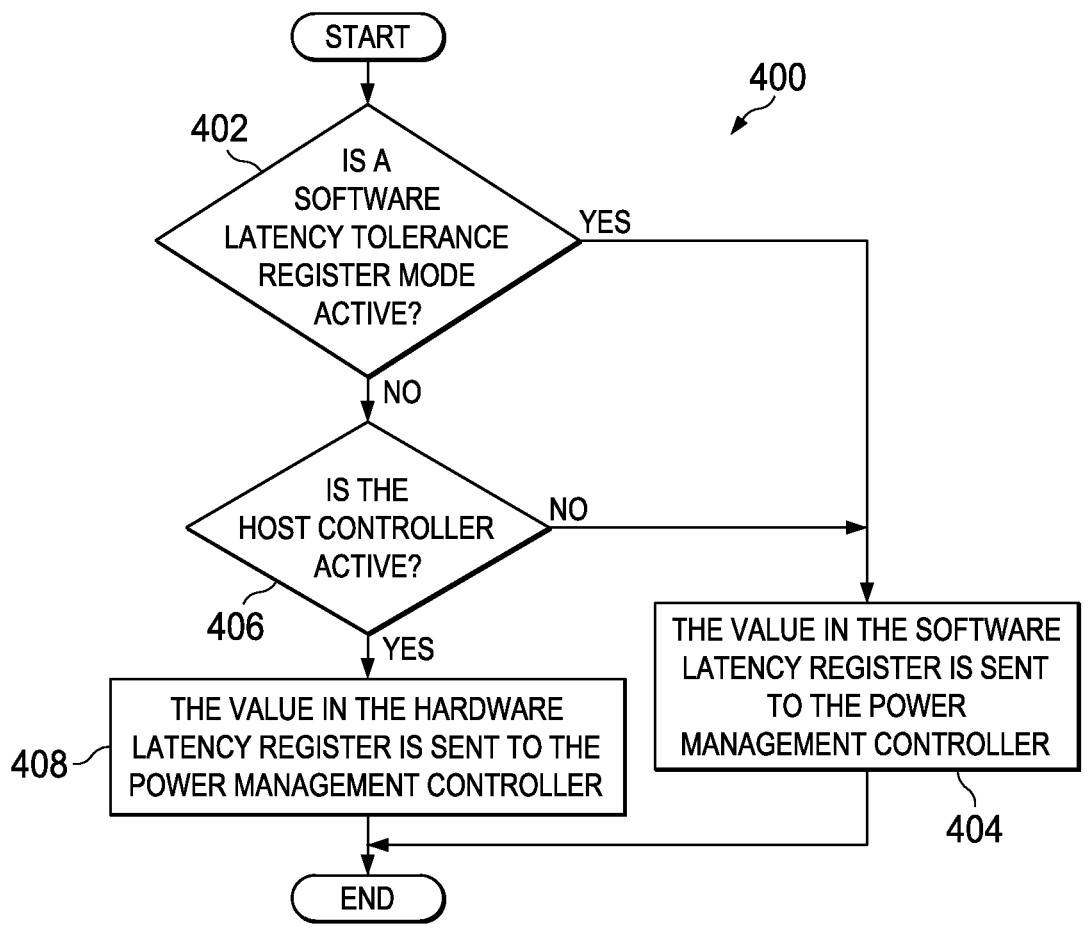
FIG. 4 illustrates, for one embodiment, an example flow diagram in accordance with one embodiment of the present disclosure.

Turning to FIG. 4, FIG. 4 is a simplified flowchart 400 illustrating one potential operation associated with the present disclosure. At 402, the system determines if the software LTR mode is active. If the software LTR mode is active, then the value in the software latency register is sent to the power management controller, as in 404. If the software latency tolerance register mode is not active, then the system determines if the host controller is active, as in 406. If the host controller is active then the value in the hardware latency register is sent to the power management controller, as in 408. If the host controller is not active, then the value in the software latency register is sent to the power management controller, as in 404.

Figure 5:
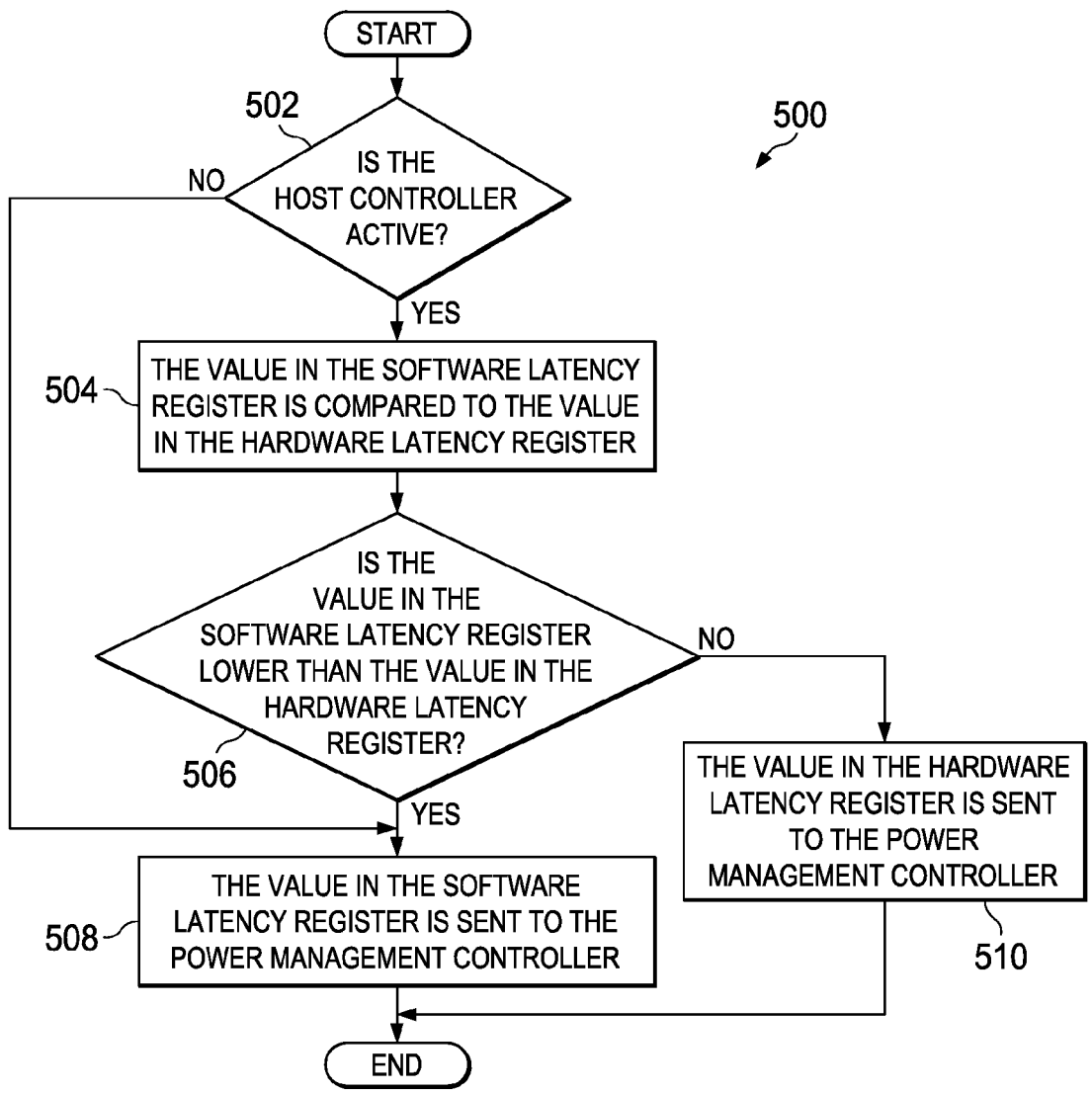
FIG. 5 illustrates, for one embodiment, an example flow diagram in accordance with one embodiment of the present disclosure.

Turning to FIG. 5, FIG. 5 is a simplified flowchart 500 illustrating one potential operation associated with the present disclosure. At 502, the system determines if the host controller is active. If the host controller is not active, then the value in the software latency register is sent to the power management controller, as in 508. If the host controller is active, then the value in the software latency register is compared to the value in the hardware latency register, as in 504. At 506, the system determines if the value in the software latency register is lower than the value in the hardware latency register. If the value in the software latency register is not lower than the value in the hardware latency register, then the value in the hardware latency register is sent to the power management controller, as in 510. If the value in the software latency register is lower than the value in the hardware latency register, then the value in the software latency register is sent to the power management controller, as in 508.

Figure 6:
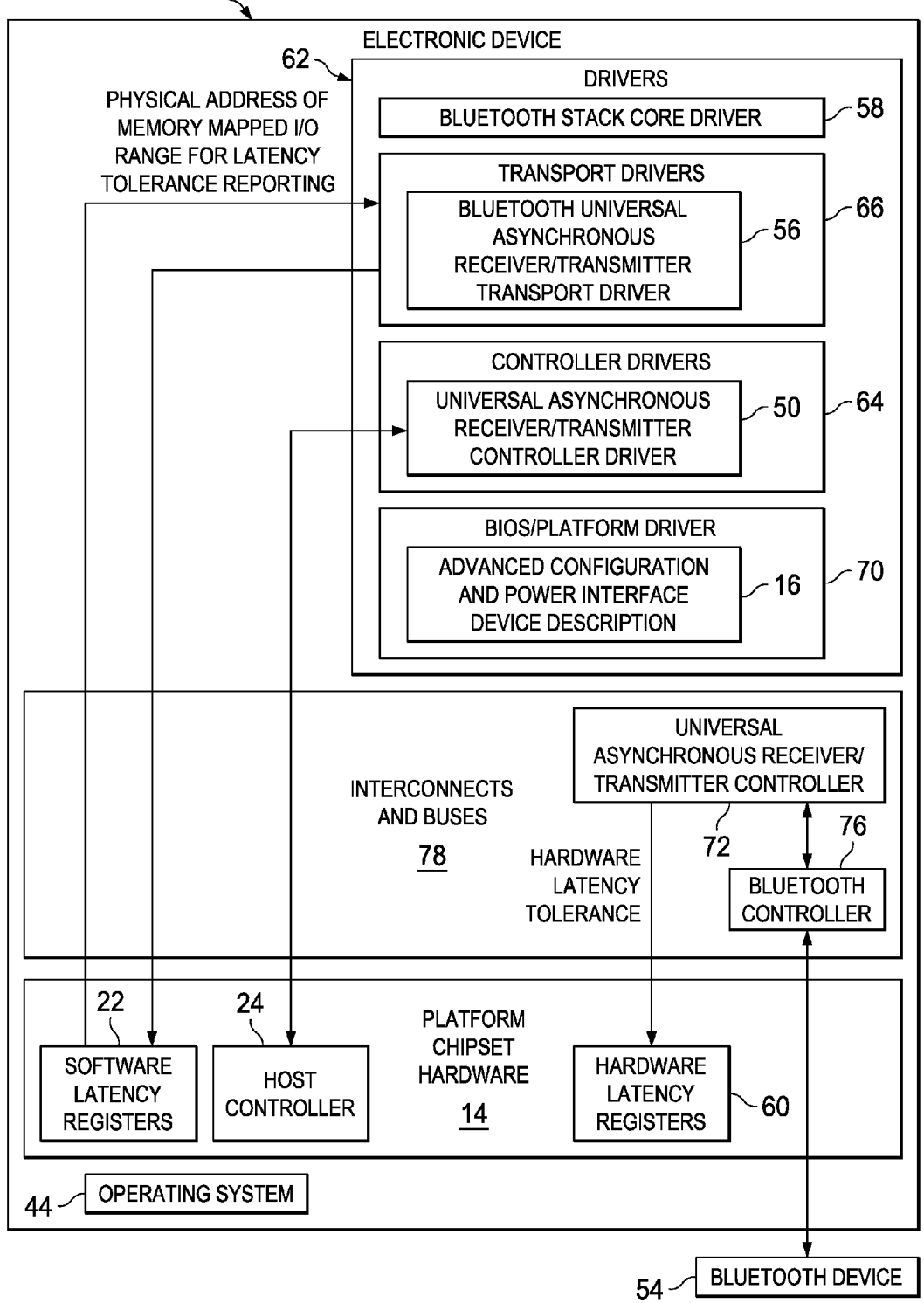
FIG. 6 is a simplified schematic diagram illustrating an embodiment of an electronic device, in accordance with one embodiment of the present disclosure.

FIG. 6 is a block diagram illustrating software component interaction of an electronic device 10 according to at least one example embodiment. The examples of FIG. 6 are merely examples of software component interaction, and do not limit the scope of the claims. For example, the number of electrical components may vary, the placement of the electrical components may vary, operations attributed to a software component may vary, number of software components may vary, composition of a software component may vary, and/or the like. In some example embodiments, operations attributable to one software component of the example of FIG. 6 may be allocated to one or more other software components.

In at least one example embodiment, electronic device 10 includes platform hardware 14, operating system 44, drivers 62, and interconnects and buses 78. Platform hardware 14 includes software latency registers 22, host controller 24, and hardware latency registers 60. Drivers 62 contain a Bluetooth stack core driver 58, controller drivers 64, transport drivers 66, and BIOS/platform drivers 70. Note that the present disclosure can be applicable to Bluetooth Core Specification version 4.0 adopted 30 Jun. 2010. Additionally, the present disclosure is applicable to any other version of the Bluetooth Specification. Transport drivers 66 include a Bluetooth UART transport driver 56. Controller drivers 64 include a UART controller driver 50. Interconnects and buses 78 include UART controller 72 and a Bluetooth controller 76.

BIOS/platform driver 70 can map the software latency registers 22 in platform hardware 14 to a resource space in software latency registers 22 for a Bluetooth device 54. The mapping may be as described in an ACPI device description 16 for Bluetooth device 54. During a resource enumeration/boot by OS 44, OS 44 can convert memory-mapped IO (MMIO) descriptors (e.g., software latency tolerance registers 30 (FIG. 1)) in ACPI device description 16 for software latency registers 22 that have been included in Bluetooth device's 54 ACPI device description 16 into memory resource descriptors. The memory resource descriptors can be conveyed to Bluetooth UART transport driver 56 during driver initialization. Bluetooth UART transport driver 56 can map the physical address for the MMIO range for software latency registers 22 provided as memory resource descriptor by OS 44. Once these MMIOs are mapped, Bluetooth UART transport driver 56 is able to access software latency registers 22.

While Bluetooth device 54 is in an ACPI D0 state and actively transmitting or receiving data, Bluetooth UART transport driver 56 is responsible for updating software latency register 22 as often as needed to reflect the current latency requirements of Bluetooth device 54. If Bluetooth device 54 is transitioning to an idle or low power device state (exiting D0 and transitioning to either a D2 or D3 power state), Bluetooth transport driver 56 can update software latency registers 22 with value NO_REQ (No requirement) prior to exiting the D0 state. Bluetooth UART transport driver 56 should only promote a latency value associated with active traffic when Bluetooth device 54 is active and in a D0 state.

Figure 7:
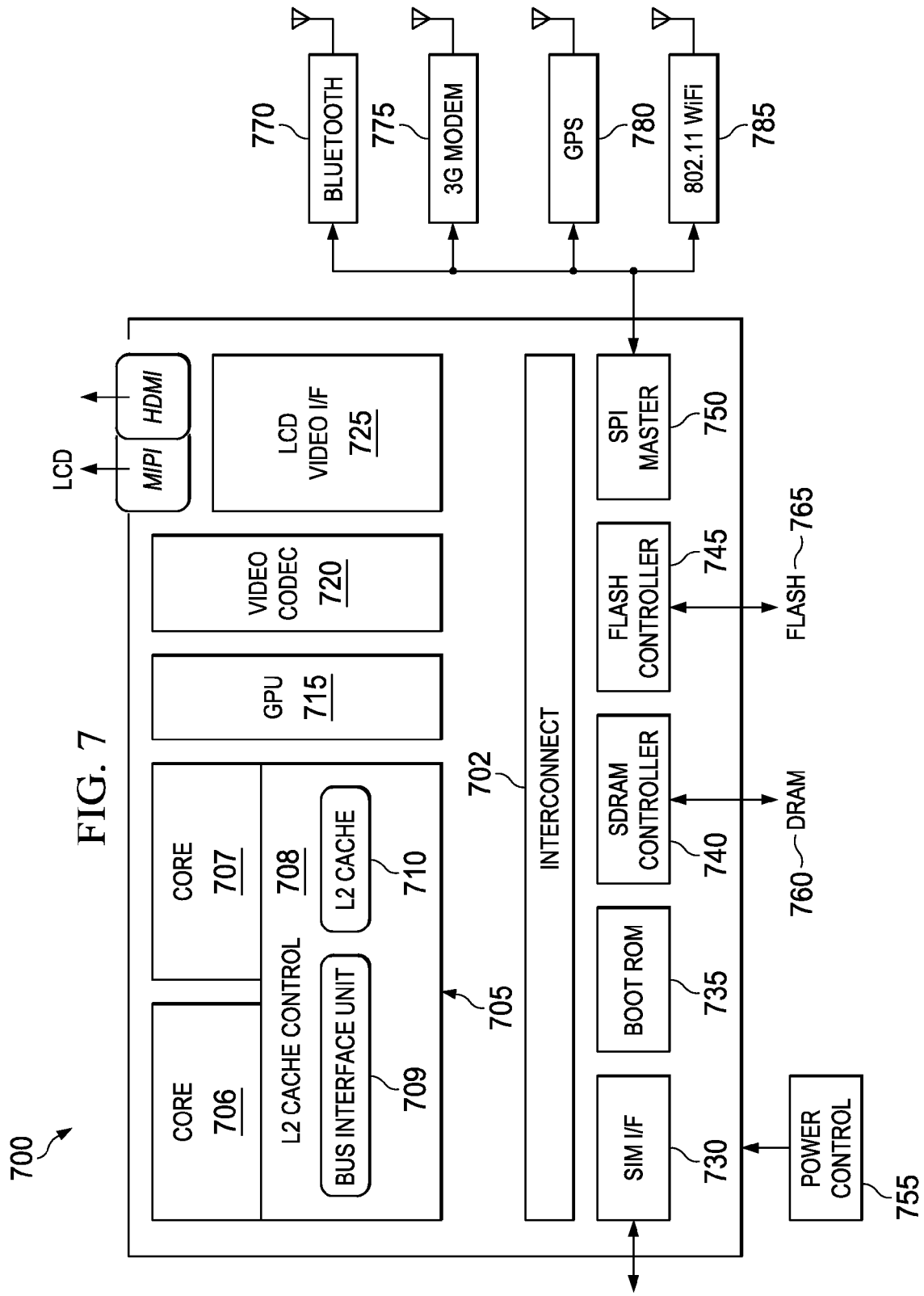
FIG. 7 is a simplified block diagram associated with an example ARM ecosystem system on chip (SOC) of the present disclosure.

FIG. 7 is a simplified block diagram associated with an example ARM ecosystem SOC 700 of the present disclosure. At least one example implementation of the present disclosure includes an integration of the power savings features discussed herein and an ARM component. For example, the example of FIG. 7 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LDC.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiment include one or more communication capabilities, interfaces, and features such as instances of Bluetooth 770, a 3G modem 775, a global positioning system (GPS) 780, and an 802.11 WiFi 685.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
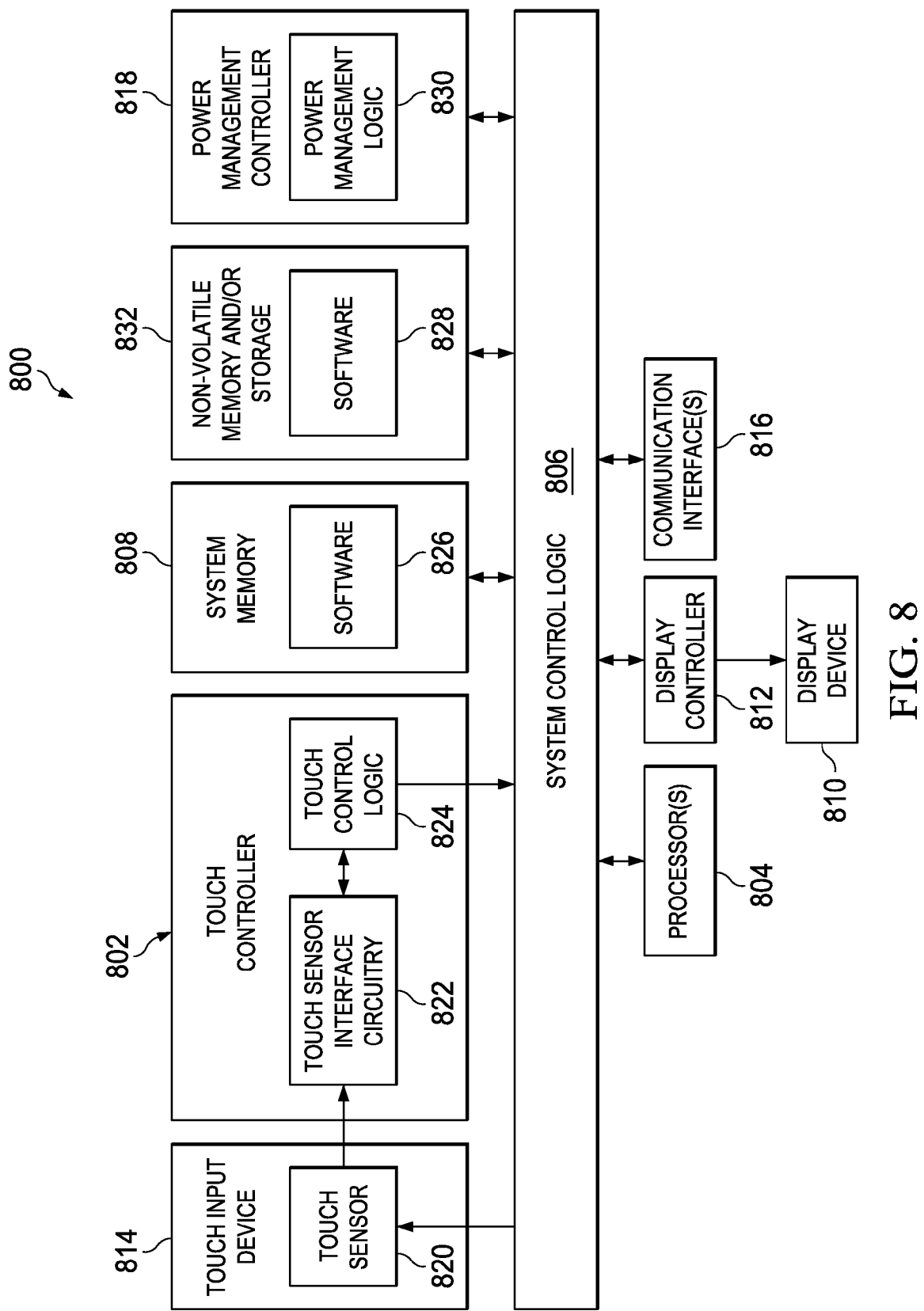
FIG. 8 is a simplified block diagram illustrating potential electronics associated with the electronic device.

FIG. 8 is a simplified block diagram illustrating potential electronics and logic that may be associated with any of the power saving operations discussed herein. In at least one example embodiment, system 800 includes a touch controller 802, one or more processors 804, system control logic 806 coupled to at least one of processor(s) 804, system memory 808 coupled to system control logic 806, non-volatile memory and/or storage device(s) 810 coupled to system control logic 806, display controller 812 coupled to system control logic 806, display controller 812 coupled to a display, power management controller 818 coupled to system control logic 806, and/or communication interfaces 816 coupled to system control logic 806.

System control logic 806, in at least one embodiment, includes any suitable interface controllers to provide for any suitable interface to at least one processor 804 and/or to any suitable device or component in communication with system control logic 806. System control logic 806, in at least one example embodiment, includes one or more memory controllers to provide an interface to system memory 808. System memory 808 may be used to load and store data and/or instructions, for example, for system 800. System memory 808, in at least one example embodiment, includes any suitable volatile memory, such as suitable dynamic random access memory (DRAM) for example. System control logic 806, in at least one example embodiment, includes one or more input/output (I/O) controllers to provide an interface to a display device, touch controller 802, and non-volatile memory and/or storage device(s) 810.

Non-volatile memory and/or storage device(s) 810 may be used to store data and/or instructions, for example within software 828. Non-volatile memory and/or storage device(s) 810 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions disclosed herein or any part thereof. In at least one example embodiment, power management controller 818 is configured to reduce the power consumption of components or devices of system 800 that may either be operated at reduced power or turned off when the electronic device is in the closed configuration. For example, in at least one example embodiment, when the electronic device is in a closed configuration, power management controller 818 performs one or more of the following: power down the unused portion of a display and/or any backlight associated therewith; allow one or more of processor(s) 804 to go to a lower power state if less computing power is required in the closed configuration; and shutdown any devices and/or components, such as a keyboard, that are unused when an electronic device is in the closed configuration.

Communications interface(s) 820 may provide an interface for system 800 to communicate over one or more networks and/or with any other suitable device. Communications interface(s) 820 may include any suitable hardware and/or firmware. Communications interface(s) 820, in at least one example embodiment, may include, for example, a network adapter, a wireless network adapter, a telephone modem, and/or a wireless modem.

System control logic 806, in at least one example embodiment, includes one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 804 may be packaged together with logic for one or more controllers of system control logic 806. In at least one example embodiment, at least one processor 804 may be packaged together with logic for one or more controllers of system control logic 806 to form a System in Package (SiP). In at least one example embodiment, at least one processor 804 may be integrated on the same die with logic for one or more controllers of system control logic 806. For at least one example embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for one embodiment may support any suitable multi-touch technology.

Touch control logic 824 may be coupled to output digital touch input data to system control logic 806 and/or at least one processor 804 for processing. At least one processor 804 for one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the circuits discussed herein. Some of these blocks may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

EXAMPLE EMBODIMENT IMPLEMENTATIONS

In at least one embodiment described herein, an apparatus is provided that can include means for communicating (e.g., over any suitable interface, link, bus, communication pathway, processor, software, circuitry, a hub, a controller, etc.) a latency tolerance value for a device connected to a platform from a software latency register if a software latency tolerance register mode is active. The apparatus may also include means for communicating (e.g., over any suitable interface, link, bus, communication pathway, processor, software, circuitry, a hub, a controller, etc.) the latency tolerance value from a hardware latency register if a host controller is active. The latency tolerance value can be sent to a power management controller. More specific examples can include means for communicating (e.g., over any suitable interface, link, bus, communication pathway, processor, software, circuitry, a hub, a controller, etc.) a latency tolerance value from the software latency register if the software latency tolerance register mode is not active and the host controller is not active. The apparatus can also include means for mapping a resource space in the software latency register for the device using a BIOS/platform driver. The mapping can be achieved using an advanced configuration and power interface device description for the device.

What is claimed is:

1. A method for managing power, comprising:
communicating a latency tolerance value, wherein the latency tolerance value is:
associated with a first value stored in a software latency register for a device connected to a platform if a software latency tolerance register mode is active; and
associated with a second value stored in a hardware latency register if a host controller is active.

2. The method of claim 1, wherein the latency tolerance value is sent to a power management controller.

3. The method of claim 1, further comprising:
communicating the first value stored in the software latency register if the software latency tolerance register mode is not active and the host controller is not active.

4. The method of claim 1, further comprising:
mapping a resource space in the software latency register for the device using a BIOS/platform driver.

5. The method of claim 4, wherein the mapping is achieved using an advanced configuration and power interface device description for the device.

6. The method of claim 1, further comprising:
updating the first value stored in the software latency register when the device is in an active state.

7. The method of claim 1, wherein a universal asynchronous receiver/transmitter driver for the device is used to update the first value stored in the software latency register.

8. The method of claim 1, further comprising:
updating the first value stored in the software latency register with a no requirement value when the device is idle.

9. An apparatus, comprising:
logic at least partially implemented in hardware, the logic configured to:
communicate a latency tolerance value, wherein the latency tolerance value is:
associated with a first value stored in a software latency register for a device connected to a platform if a software latency tolerance register mode is active; and
associated with a second value stored in a hardware latency register if a host controller is active.

10. The apparatus of claim 9, wherein the latency tolerance value is sent to a power management controller.

11. The apparatus of claim 9, wherein the logic is further configured to:
communicate the first value stored in the software latency register if the software latency tolerance register mode is not active and the host controller is not active.

12. The apparatus of claim 9, wherein the logic is further configured to:
map a resource space in the software latency register for the device using a BIOS/platform driver.

13. The apparatus of claim 12, wherein the mapping is achieved using an advanced configuration and power interface device description for the device.

14. The apparatus of claim 9, wherein the logic is further configured to:
update the first value stored in the software latency register when the device is in an active state.

15. The apparatus of claim 14, wherein a universal asynchronous receiver/transmitter driver for the device is used to update the first value stored in the software latency register.

16. The apparatus of claim 9, wherein the logic is further configured to:
update the first value stored in the software latency register with a no requirement value when the device is idle.

17. A non-transitory computer readable medium comprising instructions that, when executed by a processor, cause an apparatus to:
communicate a latency tolerance value, wherein the latency tolerance value is:
associated with a first value stored in a software latency register for a device connected to a platform if a software latency tolerance register mode is active; and
associated with a second value stored in a hardware latency register if a host controller is active.

18. The computer readable medium of claim 17, wherein the latency tolerance value is sent to a power management controller.

19. The computer readable medium of claim 17, further comprising instructions that, when executed by a processor, cause the apparatus to:
communicate the first value stored in the software latency register if the software latency tolerance register mode is not active and the host controller is not active.

20. The computer readable medium of claim 17, further comprising instructions that, when executed by a processor, cause the apparatus to:
map a resource space in the software latency register for the device using a BIOS/platform driver.

21. The computer readable medium of claim 20, wherein the mapping is achieved using an advanced configuration and power interface device description for the device.

22. The computer readable medium of claim 17, further comprising instructions that, when executed by a processor, cause the apparatus to:
update the first value stored in the software latency register when the device is in an active state.

23. The computer readable medium of claim 22, wherein a universal asynchronous receiver/transmitter driver for the device is used to update the first value stored in the software latency register.

24. The computer readable medium of claim 17, further comprising instructions that, when executed by a processor, cause the apparatus to:
update the first value stored in the software latency register with a no requirement value when the device is idle.

25. An apparatus, comprising:
a circuit for communicating a latency tolerance value, wherein the latency tolerance value is:
associated with a first value stored in a software latency register for a device connected to a platform if a software latency tolerance register mode is active; and
associated with a second value stored in a hardware latency register if a host controller is active.

26. The apparatus of claim 25, further comprising:
a circuit for communicating the first value stored in the software latency register if the software latency tolerance register mode is not active and the host controller is not active.

27. The apparatus of claim 25, further comprising:
a circuit for mapping a resource space in the software latency register for the device using a BIOS/platform driver.

* * * * *